United States Patent [19]
Litteral et al.

[11] Patent Number: 5,247,347
[45] Date of Patent: Sep. 21, 1993

[54] PSTN ARCHITECTURE FOR VIDEO-ON-DEMAND SERVICES

[75] Inventors: Larry A. Litteral, Manassas, Va.;
Jeffrey B. Gold, Silver Spring, Md.;
Donald C. Klika, Jr., Falls Church;
Daniel B. Konkle, Fairfax, both of Va.; Carl D. Coddington, Accokeek;
James M. McHenry, Silver Spring, both of Md.; Arthur A. Richard, III, Springfield, Va.

[73] Assignee: Bell Atlantic Network Services, Inc., Arlington, Va.

[21] Appl. No.: 766,535

[22] Filed: Sep. 27, 1991

[51] Int. Cl.[5] .............................................. H04N 7/14
[52] U.S. Cl. .................................... 358/85; 379/105; 455/4.2
[58] Field of Search ................. 379/102, 104, 105, 94, 379/93; 358/84-86; 455/4.2

[56] References Cited

U.S. PATENT DOCUMENTS

| | | |
|---|---|---|
| 3,766,324 | 10/1973 | Budrys et al. . |
| 4,332,980 | 6/1982 | Reynolds et al. . |
| 4,381,522 | 4/1983 | Lambert . |
| 4,506,387 | 3/1985 | Walter . |
| 4,654,866 | 3/1987 | Bottle et al. . |
| 4,755,872 | 7/1988 | Bestler et al. . |
| 4,761,684 | 8/1988 | Clark et al. . |
| 4,763,191 | 8/1988 | Gordon et al. . |
| 4,792,849 | 12/1988 | McCalley et al. . |
| 4,797,913 | 1/1989 | Kaplan et al. . |
| 4,807,023 | 2/1989 | Bestler et al. . |
| 4,829,372 | 5/1989 | McCalley et al. ........... 358/86 |
| 4,849,811 | 7/1989 | Kleinerman . |
| 4,852,154 | 7/1989 | Lewis et al. . |
| 4,890,320 | 12/1989 | Monslow et al. . |
| 4,897,867 | 1/1990 | Foster et al. . |
| 4,949,187 | 8/1990 | Cohen . |
| 4,995,078 | 2/1991 | Monslow et al. . |
| 5,010,399 | 4/1991 | Goodman et al. . |
| 5,014,125 | 5/1991 | Pocock et al. . |
| 5,130,792 | 7/1992 | Tindell et al. . |
| 5,132,992 | 7/1992 | Yurt et al. . |
| 5,133,079 | 7/1992 | Ballantyne et al. ........... 358/86 |

FOREIGN PATENT DOCUMENTS 2193420 of 1986 European Pat. Off. .

OTHER PUBLICATIONS

Talk given at the Motion Picture Industry Seminar, Dec. 3, 1984 "Dial-A-View" by A. F. Bulfer.
"A Trial of a National Pay-Per-View Ordering and Billing System" by Andrew Bulfer et al., NCTA Technical Papers (1986).
"BERKOM Test Network and BISDN/CATV Concept" by G. Domann, Electrical Communication, vol. 62, No. 3/4 (1988).

(List continued on next page.)

Primary Examiner—Wing F. Chan
Attorney, Agent, or Firm—Lowe, Price, LeBlanc & Becker

[57] ABSTRACT

A public switched telephone network (PSTN) provides digital video signals from a video information provider to one or more of a plurality of subscriber premises. A subscriber uses either a standard telephone instrument over the PSTN or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse control channel from the subscriber to the central office for transmission on the ISDN packet data network back to the video information provider. The interfaces also allow base band signalling and audio between the central office and the subscriber for conventional telephone instrument connectivity.

19 Claims, 8 Drawing Sheets

OTHER PUBLICATIONS

"Visual Telephony as an ISDN Application", by Ming Liou, IEEE Communications Magazine (1990).

"1.544-Mbit/s Transmission of TV Signals by Interframe Coding System" by H. Yasuda et al., IEEE Transactions on Communications (1976).

"Enhanced Video Response System-VRS Phae II-" by H. Nakajima, Japan Telecommunications Review (1979).

"Video Response System-VRS-" by K. Haji, International Conference on Communications (1978).

"Dial V for Video", Video Magazine dated Mar. 1982.

"MCPIC: A Video Coding Algorithm for Transmission and Storage Applications" by A. Wong et al., IEEE Communications Magazine (1990).

"Digital Multimedia Systems" Communications of the ACM, vol. 34, No. 4 (1991).

PSTN ARCHITECTURE FOR VIDEO-ON-DEMAND SERVICES

TECHNICAL FIELD

The invention relates to a Public Switched Telephone Network (PSTN) configuration and, more particularly, to a combined voice and data switching configuration and method for supplying connectivity from a remote or collocated video provider to a local subscriber over a PSTN.

BACKGROUND ART

Distribution of full motion video data has evolved from the early days of television broadcasting to meet viewer demand. Earliest video distribution was by point-to-point wiring between a camera and a video monitor. This was followed shortly thereafter by the proliferation of television broadcast stations transmitting fixed schedules of programming over the public air waves. In the 1960s, Community Antenna Television (CATV) systems were established, initially to provide off-air television signals to viewers in broadcast reception fringe areas. Under FCC regulation, the CATV industry was required to provide local access and original programming in addition to required off-air broadcast signal distribution. In response to the requirement for further television programming, several sources of cable network programming were established. Because of the wide bandwidth available on cable television systems, additional channels were made available for the new programming. However, the programming was generally prescheduled with the viewer left to tune into the designated channel at the appointed time to view a particular program.

To increase revenues, cable television systems initiated distribution of premium channels viewable only by subscribers having appropriate descramblers. The descrambler apparatus would receive premium channels and descramble the video and audio information to supply an output signal capable of reception on a standard television set. Pay per view programs were later provided. These programs included recently released movies, live concerts and popular sporting events. Subscribers wishing to view a pay-per-view program would place an order with the cable operator. In response, at the designated time, the subscriber's descrambler would be activated to permit viewing of the pay per view programming. However, the subscriber was restricted to viewing the programming at the scheduled time; there was no provision for providing programming to a subscriber at a time and date specified by the subscriber.

For example, Bessler et al., U.S. Pat. No. 4,755,872, describes an impulse pay-per-view system for use with a cable system having one-way addressable converters. Each of several central offices in a metropolitan area provide Automatic Number Identification (ANI) information representing the cable subscriber's phone number and the code representing the cable event to be viewed or cancelled. The data is sent asynchronously to a Telephone Communication Unit (TCU) located at a central office. The TCU sends the data asynchronously to a Telephone Communication Controller (TCC) located at a cable head end station. A system controller at the head end receives the data from each subscriber, locates a corresponding home terminal unit address, and performs other housekeeping activities. The controller then authorizes the home terminal unit to receive and descramble the requested program.

In the early 1980s, technological advances resulted in the proliferation of Video Cassette Recorders (VCR), thereby establishing a second channel for video programming distribution. Pre-recorded video programs were made available for sale and rental to VCR owners. With a VCR, the viewer could select from many titles available for sale and rental and could view the program when convenient. The VCR owner further had the capability to selectively view the programming using special functions of the VCR. Thus, the viewer could pause, fast forward, reverse and replay portions of the program at will. The penalty for this convenience, however, was the added inconvenience of making a trip to the local video sales and/or rental store, waiting for a popular video program to become available for sale and/or rental, returning home to view a video cassette, and the required trip back to the video store to return a rental tape.

To combine the benefits of both cable and video cassette distribution of programming, some cable operators have proposed programming-on-demand cable systems. For example, Walter, U.S. Pat. No. 4,506,387, describes a programming-on-demand cable system which allows a user to select a video program from a library of programs. The user transmits the program request over a dedicated fiber optic control cable to a central data station. The video program is then transmitted at a high, non-real-time rate over a fiber optic line network to a data receiving station at the user's location. A data receiving station then converts the received optical data back to electrical data and stores it for subsequent real time transmission to the user's television set.

Pooock et al., U.S. Pat. No. 5,014,125, describes an interactive television system for transmission of still frame video images and accompanying audio over a television system such as a cable network. A telephone network is used to establish a two-way communication path between a viewer's location and a central location. Information pertaining to the viewer, as well as commands related to the viewer selections for presentations and other data, are transmitted to the central location from a terminal at the viewer site by means of a telephone connection. The same telephone connection is used to transmit audio information from the central location to the viewer's terminal. The audio is combined with video information transmitted over another medium, such as a dedicated distribution cable, by the user terminal.

Clark et al., U.S. Pat. No. 4,761,684, describes a telephone access display system using a program data processor to operate a cable television system wherein a subscriber selects video information to be displayed on a common cable channel. The subscriber accesses a data processor using a telephone and selects video information to be broadcast over the cable system by inputting a digital code using the telephone touch tone pad. The data processor processes the signal generated, retrieves the video information from memory and places it in a queue to be broadcast simultaneously to all subscribers.

Gordon et al., U.S. Pat. No. 4,763,191, describes dial-up telephone network equipment for requesting an identified selection. A caller dials a "800" dial-a-view number for placing an order for a particular selection with a telephone network. Local and toll switching offices access a centralized data base to provide routing instructions to network services equipment which acknowledge the request and provide the request to cable television distribution equipment. ANI is forwarded along with a request to the program vendor equipment. The vendor equipment supplies the requested programming to the calling customer over a local cable company via an addressable descrambler at the calling customer's television.

Monslow et al., U.S. Pat. No. 4,995,078, describes a television broadcast system using dedicated cables for real-time transmission of a viewer-chosen program at a viewer requested time to the requesting viewer's television receiver. A viewer telephones a central location to request a particular program and viewing time. Respective customer service representatives answer the incoming calls and enter the information into a scheduling computer. Alternatively, an "auto dial" device can be used to request a program, the request being made directly to a voice response system. If the chosen movie has not yet been scheduled at the requested time, an appropriate cable channel is selected by the system and an operator activates a corresponding VCR to transmit the program at the requested time.

Lambert, U.S. Pat. No. 4,381,522, discloses a system in which a viewer can telephone a cable company central location and select a video program to be broadcast over one of the channels of a cable television system. A computer schedules the selected program, transmits the program at the scheduled time, and separately transmits a directory of all the scheduled programs on a dedicated directory channel. The viewer monitors the directory channel to determine when the requested recording is scheduled to be broadcast over the cable, and then tunes to the channel indicated at the scheduled time to view the program.

A disadvantage of programming-on-demand cable systems is the limited number of different programs which can be simultaneously supplied to viewers due to the small number of unused cable channels available for distribution of video programming. With the increase of premium and pay-per-view video programming available to the cable system operator, fewer channels remain free for viewer selected programming use. Further, the subscriber must forego desirable VCR type control of the video programming including pause, fast forward and rewind.

Telephone lines have been suggested as an alternate means of video distribution. Goodman et al., U.S. Pat. No. 5,010,399, describes a video transmission system for distributing video and control signals within a residence using existing telephone wiring. By filtering, simultaneous transmission of video and control signals over active telephone lines is possible without interference with telephone communications. The patent includes an extensive discussion of problems associated with the transmission of video signals over ordinary telephone wiring.

Kleinerman, U.S. Pat. No. 4,849,811, describes simultaneously sending audio and digitized single frames of video over standard telephone lines using Binary Frequency Shift Keying (BFSK). A frame grabber is used to convert the image to a standard NTSC signal for display on a monitor.

Thus, while simultaneous real-time distribution of a relatively small number of video programs is available over existing cable television systems, the capacity of the systems is limited by the available number of vacant channels on the system. Further, limited programming choice is offered by cable distribution methods since many subscribers must watch a particular selection to justify use of a dedicated channel for the duration of the video program. Still further, cable system distribution of video programs provides minimal programming flexibility on the part of the subscriber, again dependent on channel availability. Finally, no provisions are made to control the video in real time. Thus, the subscriber is without standard VCR type controls of the program material.

In contrast to cable distribution, systems using the PSTN are often bandwidth limited, providing only still frame or video conferencing capabilities. Because the systems use the PSTN only for connectivity between subscribers and/or between subscribers and Video Information Providers (VIPs), there is no capability for dynamic routing of digitized video without requiring dedicated leased, wide bandwidth circuits. The systems also fail to provide VCR type functional control of the programming.

Accordingly, an object of the invention is to provide video programming on demand using components of the PSTN.

Another object of the invention is to provide subscriber access to multiple sources of video programming over the PSTN.

Still another object of the invention is to provide real-time subscriber control of video programming delivery.

A still further object of the invention is to provide a selected video program to a subscriber within a predetermined short processing interval after initiation of a request.

DISCLOSURE OF THE INVENTION

According to one aspect of the invention, a Public Switched Telephone Network (PSTN) provides video signals from a Video Information Provider (VIP) to one of a plurality of subscriber premises. Video data is stored and transmitted to the PSTN by the VIP in a compressed digital format together with associated compressed digital audio data. (As used herein, the phrases "video signal" and "video data" encompass combined digital video and audio data signals unless otherwise noted.)

Subscribers are provided with a subscriber interface unit including a local loop input node for receiving a multiplexed signal from a subscriber local loop. A splitter separates the multiplexed signal into a video output signal and a subscriber telephone instrument signal, these output signals being provided at respective output nodes. Corresponding Central Office (CO) interfaces are provided at the CO end of respective subscriber loop nodes. The CO interfaces include inputs for receiving video signals and a telephone instrument signal. The video and telephone instrument signals are combined by the CO interface and transmitted as a multiplexed signal to the respective subscriber loop.

A voice switch receives telephone instrument signals from the CO interface and responds to telephone number data transmitted by the telephone instrument signal. In response to the telephone number, the switch provides audio signal connectivity from the subscriber telephone local loop to a video gateway. The voice switch also provides in-band telephone connectivity to other subscribers on the network for conventional telephone communications.

The video gateway is responsive to a control signal received from the subscriber telephone instrument to provide video scheduling data to a VIP. Also responsive to the video gateway, a Digital Cross-connect System (DCS) receives video data from the video provider and supplies the video data to selected CO interfaces. Thus, the video signal from the video provider is supplied to the subscriber over the DCS, the CO interface and subscriber telephone local loop to the subscriber interface unit.

The output from the subscriber interface is provided to a decoder which performs decompression of the digitized video signal and digital-to-analog conversion. The decoder also decodes digitized audio included with the compressed video signal, converts the digitized audio signal to an analog signal and provides the output to the subscriber.

The subscriber interface further includes circuitry for transmitting digital command signals over the respective subscriber loop to the CO interface. These digital command signals include video scheduling data to be provided to the video gateway. This data link from subscriber to CO interface also supports subscriber control of video data supplied through the CO. Control data can also be provided to a data network for transmission to the VIP in support of interactive video signaling.

According to another aspect of the invention, video storage facilities provide buffering of video data received from the VIP over the DCS. The video storage facilities are controllable to provide VCR type functions including pause, slow motion, forward and reverse search, fast forward and reverse under subscriber control in response to digital command signals from the subscriber interface. These functions are available by manual input at the subscriber interface or remotely using a conventional infrared remote control unit.

Another feature of the invention includes transmission of caller identification information from the voice switch to the video gateway. The video gateway translates the caller identification information to a network address and passes the address information to the PSTN to establish digital signal connectivity to the requesting caller and for billing purposes. The caller identification information is also transmitted to the VIP for identification of the subscriber. The VIP equipment uses the subscriber's data address to establish a data link with the subscriber for interactive video control.

Another feature of the invention includes storage of subscriber access data by the video scheduling unit. The access data together with subscriber identification information, is used to define and limit system, VIP and video program title access on a time of day basis. Preprogrammed Personal Identification Numbers (PINs) are used by subscribers to override or redefine system access.

According to another object of the invention, the local loop providing connectivity between the subscriber premises and the central office can be a standard tip and ring telephone pair, a coaxial cable or a fiber optic cable.

According to another aspect of the invention, a PSTN provides video data from a VIP to subscriber premises. The VIP provides a selectable output of digitized compressed video/audio data programs including feature films, music videos, medical and commercial imaging, video phone, video conferencing, court arraignment, distance learning, surveillance video, video games, home shopping and High Definition Television (HDTV).

Subscriber loop transmission facilities supply video data from a CO location to the subscriber premises and supply subscriber order data from the subscriber premises to the CO location. The subscriber loop transmission facilities also carry telephone service signals between the subscriber premises and the CO. A CO switch receives the subscriber order data from the subscriber loop and supplies the order data to a video gateway. In response, the video gateway supplies video routing data to a DCS which, in response, supplies video data from the VIP to the subscriber loop transmission facilities.

According to another feature of the invention, data transmission means are provided for transmitting subscriber order data to the VIP. The data transmission means may include a packet data network.

The subscriber loop includes a local loop for providing connectivity between the CO and the subscriber premises. A central office interface transmits video data to the subscriber premises on the local loop and transmits subscriber control data, including order data, from the local loop to the video gateway. A subscriber interface transmits subscriber order data to the CO interface over the local loop and supplies video data from the local loop to a video output node. The local loop may comprise a standard tip and ring telephone pair, a fiber optic cable or a coaxial cable.

According to another feature of the invention, the CO switch comprises a voice switch, with telephone instrument connectivity to the switch provided between the CO and subscriber premises over the local loop. A packet data network is used to supply video control data from the subscriber local loop to the VIP for controlling the video data. The system may further include a video buffer which receives the video data from the DCS and, responsive to a video control signal, supplies the video data to the subscriber loop transmission means.

The video control data is provided over the subscriber loop transmission facilities from the subscriber premises to the video buffer to control the video data supplied to the subscriber.

According to another feature of the invention, a video directory provides a video menu of video data available from the VIP to the subscriber in response to subscriber order data. To provide an alternative method of ordering video programming, a gateway receives order data from the CO switch, and, in response, supplies (i) a voice reply signal to the voice switch and (ii) video routing data to the DCS. A voice response unit also interfaces with the video gateway to provide scheduling information to the VIP.

The subscriber loop transmission facilities include a frequency multiplexor and demultiplexor for combining and separating the (i) digital video and audio data and (ii) telephone service signals and hybrid audio signals. The telephone service signals are exchanged between the telephone instrument and CO voice switch to provide standard dial-up telephone service over the loop in addition to transfer of digital video/audio data to the subscriber. A video data expander is provided at the subscriber premises for converting the compressed digitized video and audio data into analog output signals.

The above and other objects, features and advantages of the present invention will become apparent from the

BEST MODE FOR CARRYING OUT THE INVENTION

Figure 1:
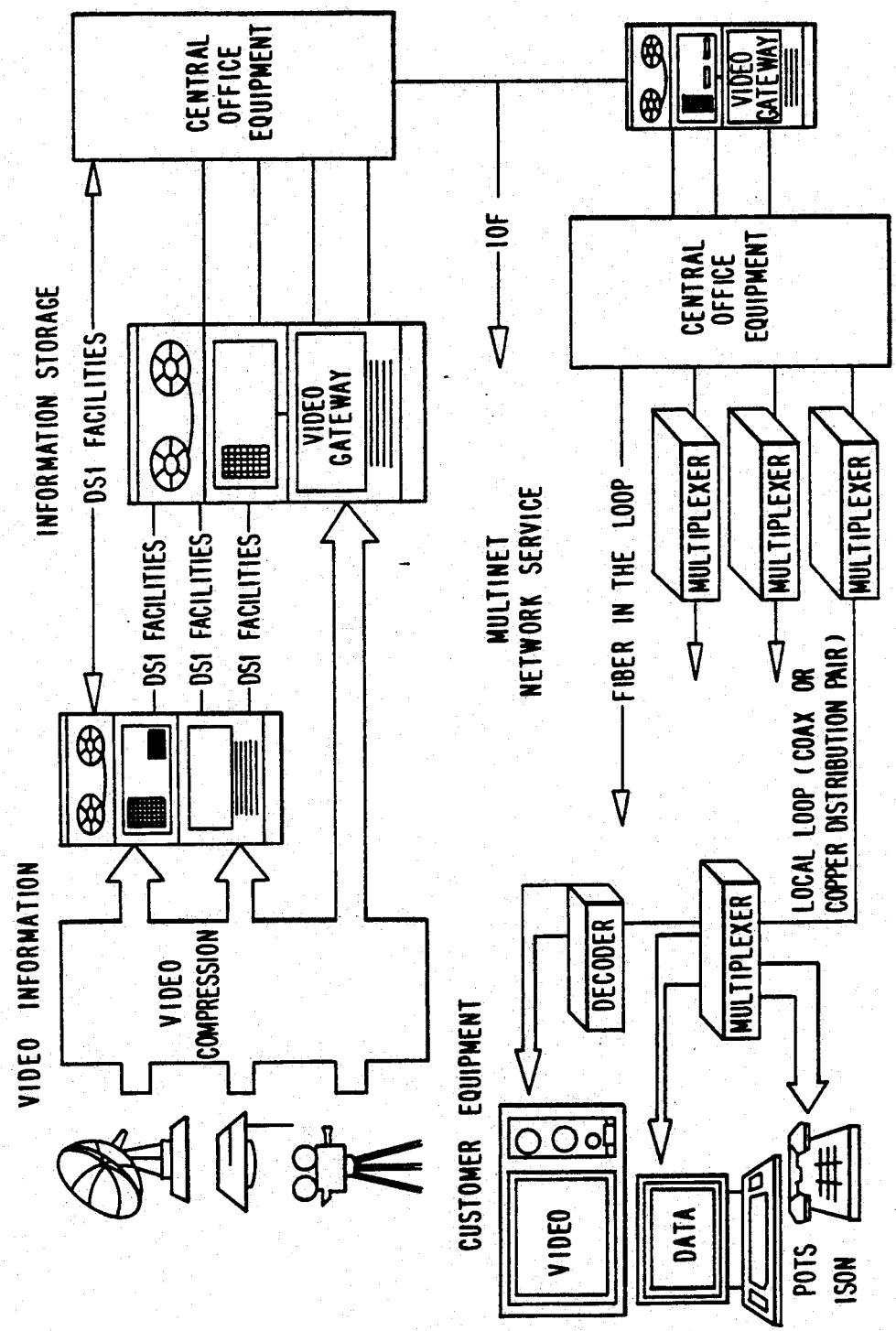
FIG. 1 is an overall diagram showing video data flow from a video information source to subscriber.

The video-on-demand service platform shown in FIG. 1 uses existing components of the Public Switched Telephone Network (PSTN). The system uses compression techniques to store video information for subsequent forwarding over interoffice facilities. The switching facilities are located in Central Offices (COs) serving residential customers or subscribers. Loop electronic devices modify the transmission characteristics of the local copper loop, to provide required enhancement to the PSTN and permit delivery of full motion video information.

Analog video information is first converted to a digital format using encoding techniques compatible with decompression algorithms now existing and being developed and standardized by the International Standards Organization (ISOs) Motion Picture Experts Group (MPEG). Each title comprises video information stored as an addressable data file in conventional data processing devices functioning as a video library.

The function of establishing and monitoring connections linking a video library port transmitting selected information with the end user ports receiving the information is performed by a supervisory controller such as a network control system, e.g., FLEXCOM ™ software, used to control the electronic digital cross-connect switches (DCS) in the PSTN. The DCS, also used for switching two-way DS-1 rate transmissions, is adapted to additionally provide bridging or broadcast of video information to several users. The normal "data session" control between a video library port and a port providing access to the video-on-demand equipment is one of the functions performed by the central processing unit in the video library. The network control software and an adjunct processor control the "network session" between the video-on-demand access port and user ports. The adjunct processor also maintains a record of relevant data regarding each session which is forwarded to a customer billing system.

Customer local loops equipped with Asymmetric Digital Subscriber Line (ADSL) devices are connected to the DCS. The video-on-demand system provides for the simultaneous transport of a one-way 1.544 megabit per second (MBPS) signal over the same twisted pair transmitting voice messages to the residential subscriber. The ADSL transported signal is demultiplexed and the 1.544 portion is then decoded using MPEG standard techniques to deliver a full motion video signal. In the PSTN, fiberoptic technology will replace existing coaxial and twisted pair connectivity with corresponding enhancements made to switching and routing equipment.

Figure 2:
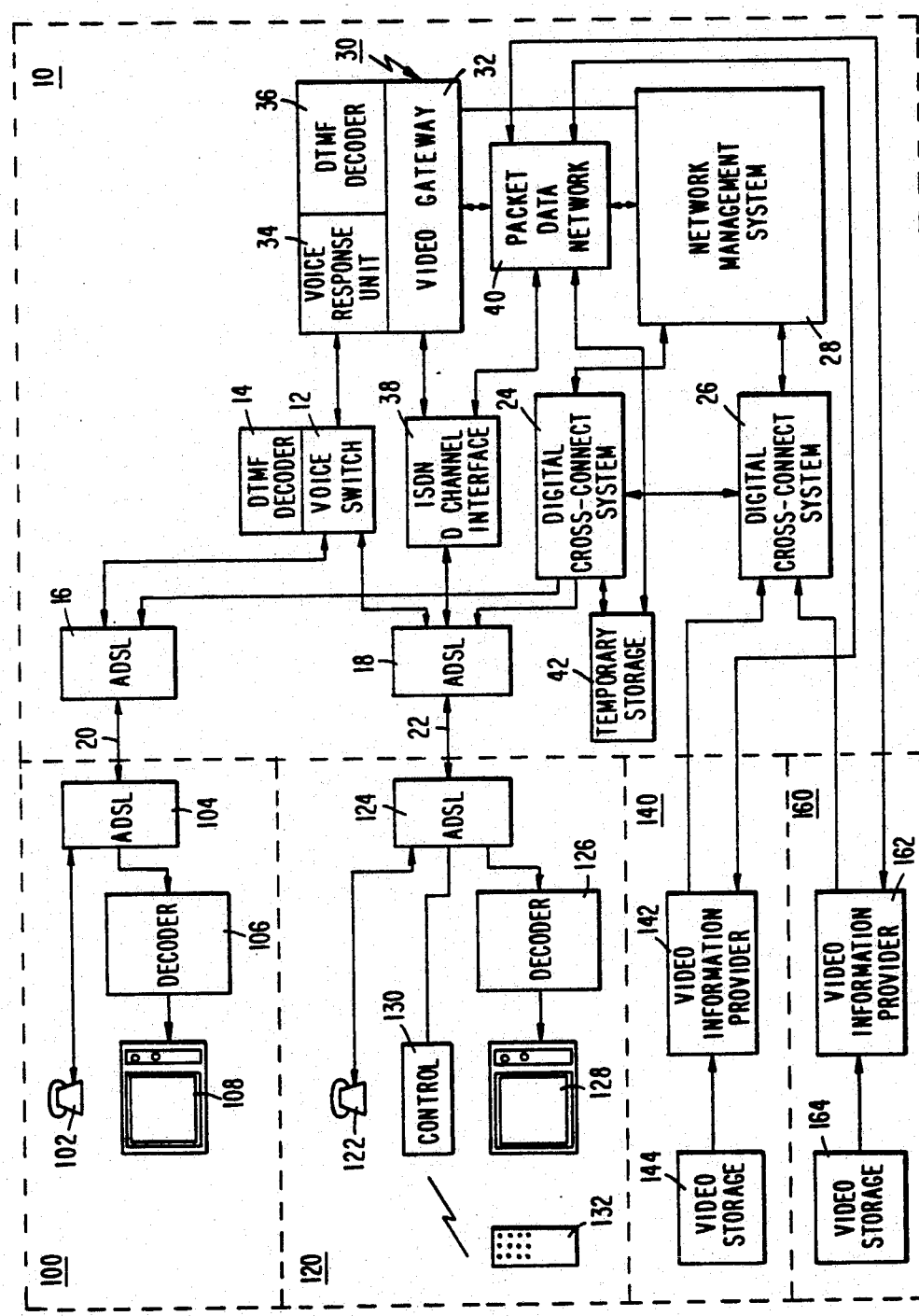
FIG. 2 is a block diagram of a video-on-demand system according to the invention.

Referring to FIG. 2, a video-on-demand system includes CO equipment 10 which is part of a PSTN. CO 10 provides video/audio connectivity from VIPs 140 and 160 selectively through the system to subscribers 100 and 120.

CO 10 includes a conventional voice switch 12 which includes means to detect off-hook, service requests, call completion (i.e., ring trip), a DTMF decoder 14 and dial pulse detector. Voice switch 12 also includes an actual telephone call connection switch for routing voice circuits among the various ports.

Connected to voice switch 12 are ADSL equipment 16 and 18 for multiplexing (i) voice and signaling information from voice switch 12 and (ii) digital video/audio information from Digital Cross-Connect System (DCS) 24 onto respective subscriber local loops 20 and 22. Digital compressed video and audio data from VIPs 140 and 160 is provided to DCS node 26. Under control of Network Management System 28, connectivity is established between DCS node 26 and DCS node 24. Output nodes of DCS 24 provide the digital video/audio data to selected ADSLs 16 and 18 for transmission to subscriber premises 100 and 120.

Figure 3:
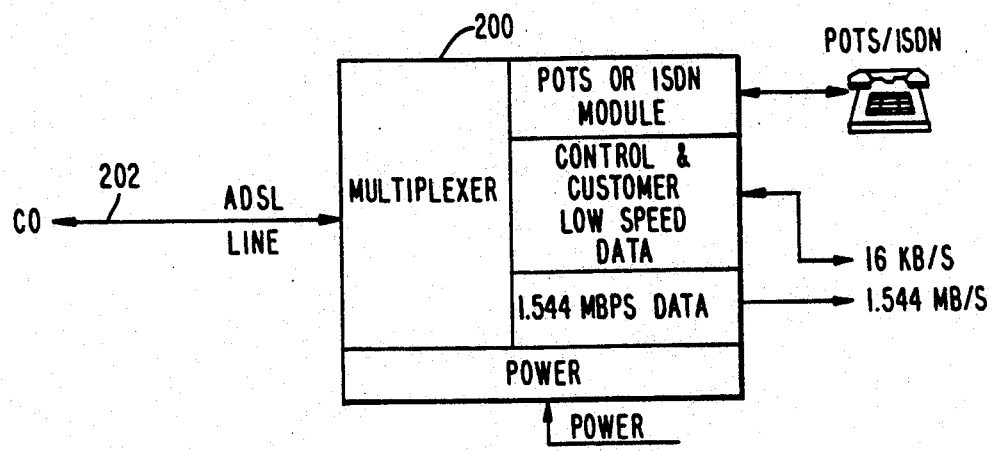
FIG. 3 is a functional diagram of a subscriber interface unit.
Figure 4:
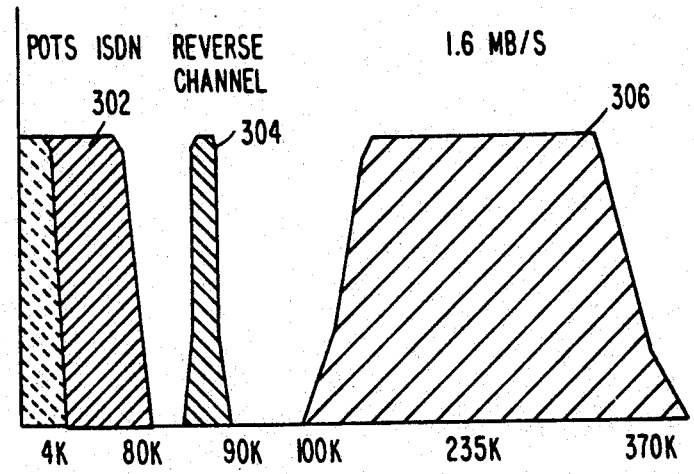
FIG. 4 is a spectrum diagram showing channelization of a local loop.

ADSLs 16 and 18 multiplex data on subscribers loops 20 and 22 using frequency multiplexing, dividing the available loop bandwidth into thee segments as shown in FIGS. 3 and 4. Base band audio and signaling below 4 kilohertz (kHz) provides connectivity for a conventional telephone services available on the "plain old telephone system" (POTS). Alternatively, ISDN channel requirements consume the bottom 80 kHz of loop bandwidth. Reverse channel digital packet information is positioned between 80 and 90 kHz providing approximately 16 kilobits per second (kbps) connectivity from the subscriber premises to a packet switched network such as ISDN network over a D-channel interface. Compressed digital video information is contained between 100 and 400 kHz to provide a 1.6 MBPS channel for transporting video/audio data over respective loops 20 and 22 to customer premises 100 and 120.

The ADSL multiplexer is functionally shown in FIG. 3. Multiplexer 200 in combination with ADSL line 202 supports transmission of a one-way 1.544 MBPS digital signal along with a POTS or a Base Rate ISDN signal over a single non-loaded copper pair. This configuration provides service to a customer over copper loop lengths of up to 18,000 feet, thereby conforming with Carrier Serving Area (CSA) and resistance design rules. The only further limitation is that the loop be non-loaded.

Referring to FIG. 4, the ADSL's transmission system provides three transmission windows on a frequency multiplex basis. The window represented by area 302 provides a 2-way channel used to provide standard POTS service or ISDN (2B+D) service over the ADSL line. Window 304 is an up-stream only (subscriber to CO), low speed data channel. The channel has a bandwidth of 32 KBPS. Sixteen KBPS of this window is used for transfer of operations, administration, maintenance, and provisioning (OAM&P) data for the ADSL unit. The remaining 16 KBPS, compatible with D channel interfaces of ISDN-BRI, is used to interface with an ISDN packet switch allowing the subscriber to interact with the network and/or the 1.544 MBPS signal provider.

Window 306 is a down-stream only (CO to subscriber) digital signal providing 1.544 MBPS transport (1.6 MBPS with overhead) for carrying the digitized compressed video signal. The combined digital downstream signal utilizes the DS1 bit map specified by ANSIT1.403-1989.

Because data channels 304 and 306 are unidirectional, the system does not experience self-NEXT (near end cross-talk). This allows concentration on the interface and interference from impulse noise because the ADSL system is loss-limited rather than NEXT limited. Impulse noise exposure can be reduced by using a pass band technique as opposed to a base band approach since impulse noise affects are greatest below 40 kHz. Therefore, a base band Quadrature Amplitude Modulation (QAM) system is preferred over a 2B1Q base band system.

Referring to FIG. 4, the lower edge for window 306 is set at 100 kHz. This edge is chosen to minimize channel loss and to allow appropriate bandwidth for base band channel 302 and reverse channel 304 and to minimize interference from impulse noise. Design of the interface provides error-free operation with ringing voltage present on the line. The system is further designed to be immune to on-hook and off-hook transients and dial pulsing. In addition to base band POTS-service, the ADSL system can co-exist with other transmission systems such as High Speed Digital Subscriber lines (HDSL) D1, T1 and data circuits.

Figure 5:
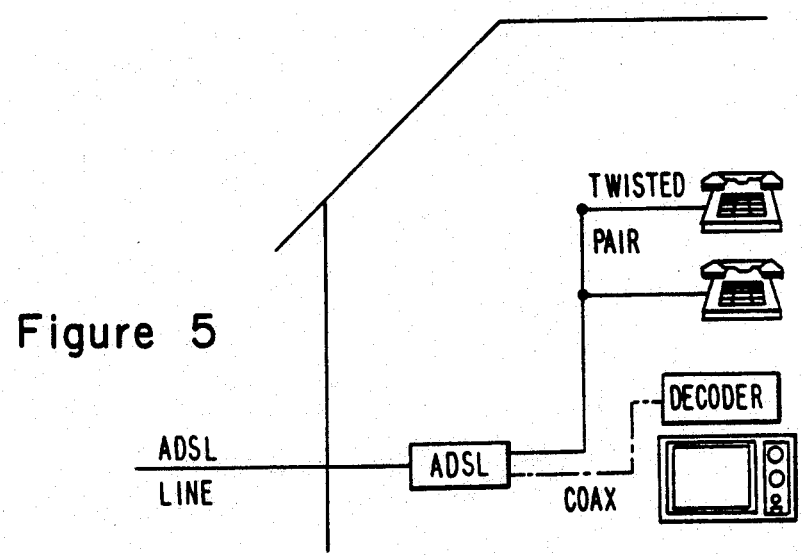
FIG. 5 shows a typical in-the-home configuration providing video transported over a 1.544 MBPS channel overlaid with standard telephone service signaling.

FIG. 5 shows a typical in-the-home configuration which provides video transported over the 1.544 MBPS channel. The unidirectional 1.544 MBPS signal carried by the ADSL system has either a Superframe Format (SF) or an Extended Superframe format (ESF). The Superframe format consists of 24 consecutive 8-bit words preceded by one bit called the framing bit (F-bit for a total of 193 bits per frame. The F-bit is time-shared to synchronize the ADSL interface equipment and to identify signaling framing. Twelve consecutive frames form a Superframe. A line code used with a Superframe format is bi-polar return-to-zero, also known as Alternate Mark Inversion (AMI).

The ESF format consists of 24 consecutive frames, each of which includes 192 information bits preceded by 1F-bit for a total of 193 bits per frame. The F-bit is used for basic frame synchronization, a cyclic redundancy check and a data link. Twenty-four frames form a Superframe. The line code used with the ESF is either AMI, bi-polar 8-zero substitution (B8ZS), or AMI with Zero-Byte Time Slot Interchange (ZBTSI).

Subscriber and CO ADSL interface units are synchronized to ensure that both units derive timing from one master clock to prevent data loss. Stand alone units derive timing from the incoming 1.544 MBPS signal. Subscriber and ADSL equipment are powered locally from the customer premises. ADSL equipment installed in the CO are powered with a DC input voltage of between −42.5 and −55 VDC.

Figure 6:
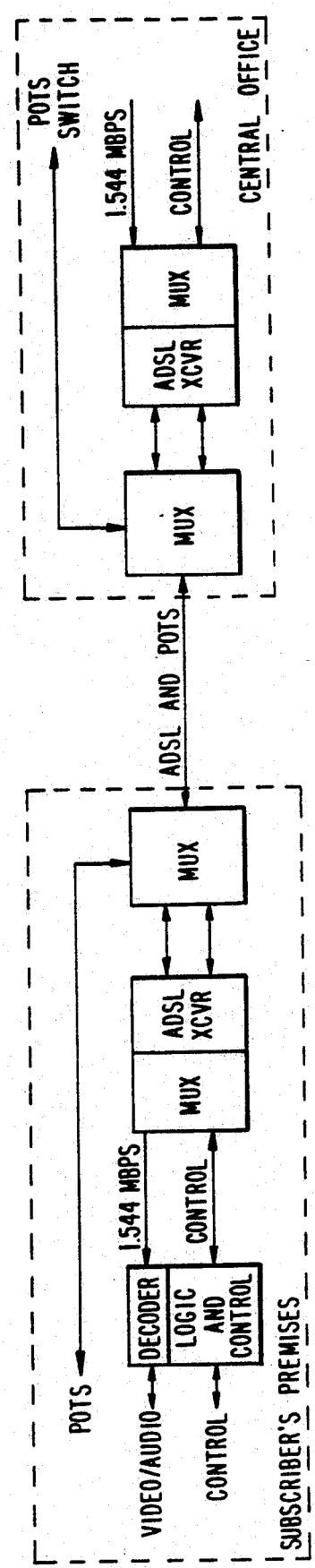
FIG. 6 is a block diagram of an asymmetrical digital subscriber line system providing simplex high-bit-rate access and POTS on a common copper loop.

FIG. 6 is a block diagram of an ADSL system providing simplex high-bit-rate video data and POTS connectivity to a subscriber over a common copper loop. The ADSL system has the transport capability to deliver a one-way high-bit-rate data stream with POTS or ISDN basic access multiplexed at baseband.

Figure 7A:
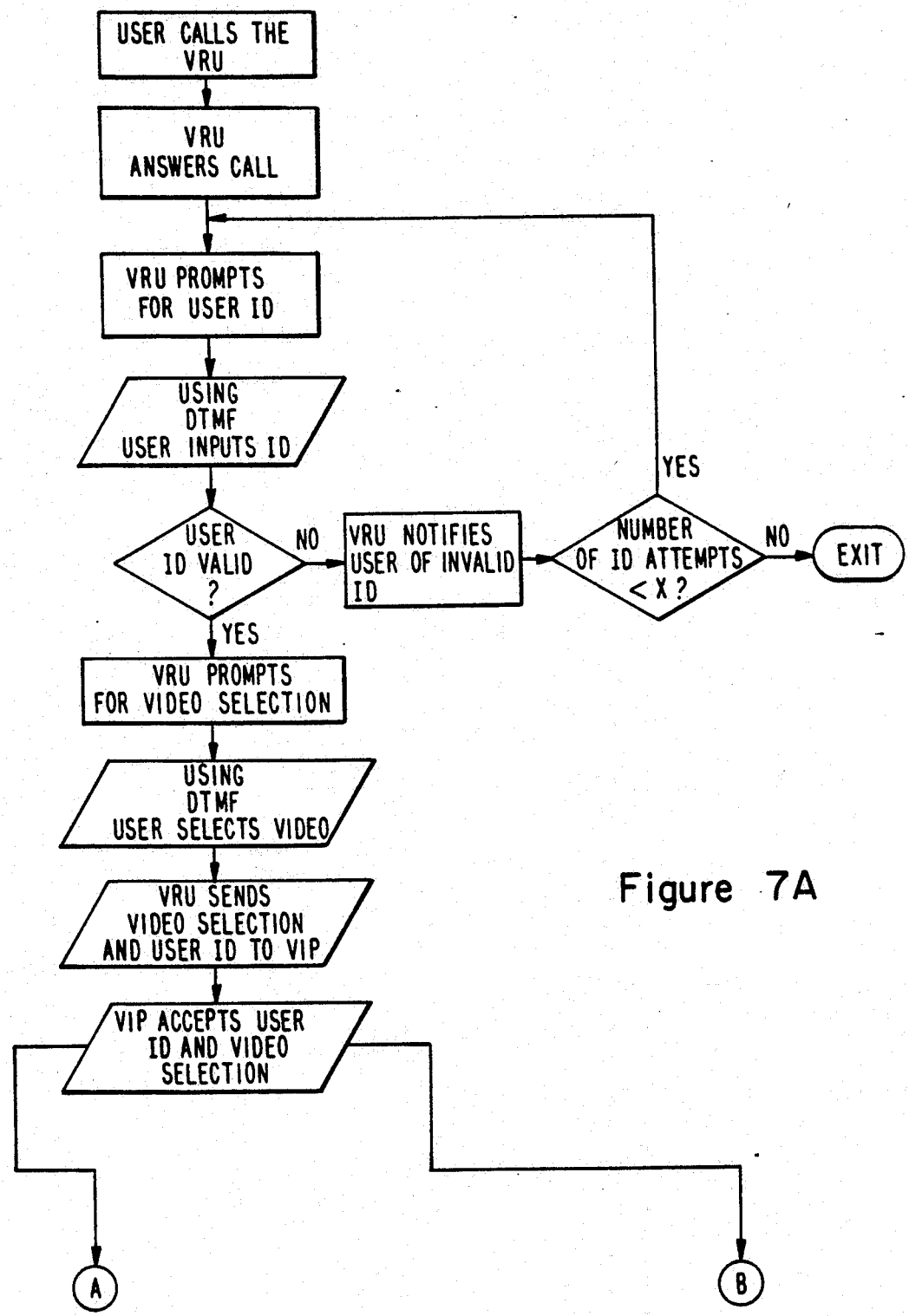
FIG. 7 is a logic diagram of a gateway for accepting subscriber video orders.
Figure 7B:
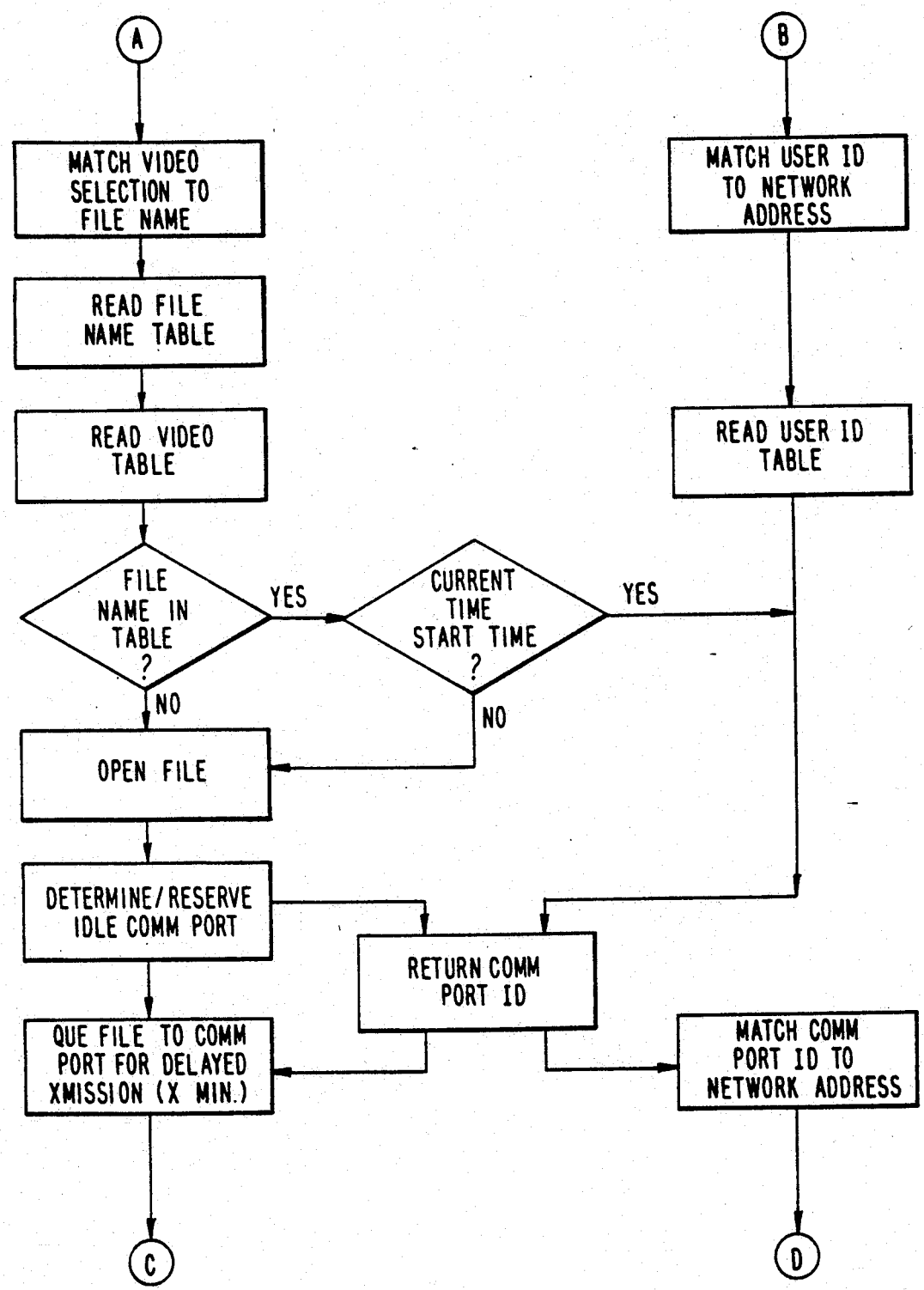
Figure 7C:
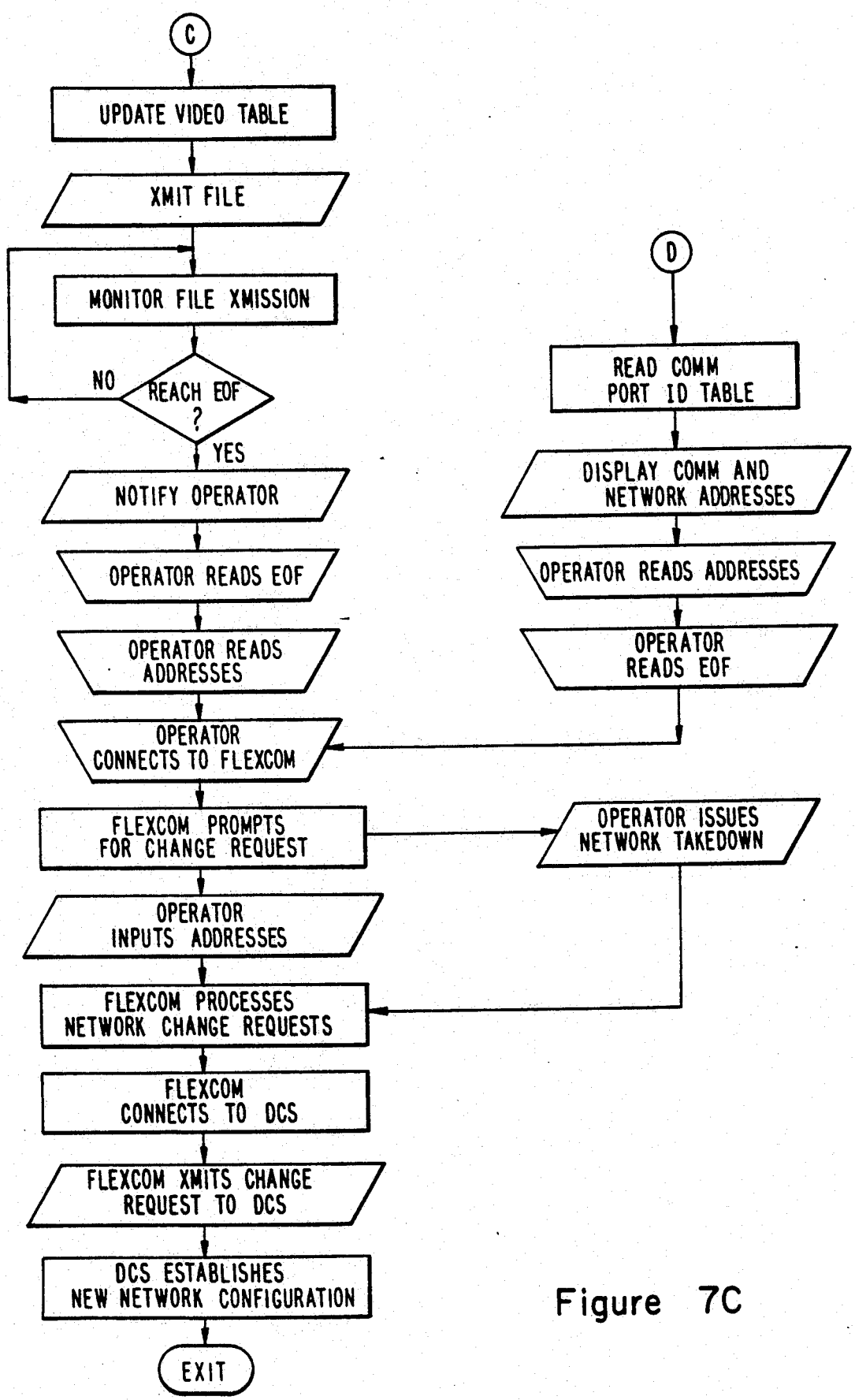

Two subscriber premises configurations 100 and 120 are shown in FIG. 2. In subscriber premises 100, video orders are placed using standard POTS service provided with telephone instrument 102 interfaced through subscriber ADSL interface 104 to voice switch 12. A subscriber at premises 100 requests the transmission of video data using telephone instrument 102 by dialing Voice Response Unit (VRU) 34 of video gateway 32 through voice switch 12. FIG. 7 is a flowchart showing operation of VRU 34 for ordering video information.

Referring to FIG. 7, voice switch 12 establishes connectivity with VRU 34 which answers the incoming call. The VRU prompts the subscriber for a user ID which is input via the DTMF pad of telephone instrument 102. The user ID is checked and, if valid, the VRU prompts for a video selection. The video selection is then input using the DTMF pad of telephone instrument 102 which then sends the selection information to the Video Information Provider (VIP) via video gateway 32 and packet data network 40. The VIP identifies the requested title and determines if the title is available.

If the title is found, and has not been previously queued for transmission, the corresponding data file is opened and a reserve idle communications port is identified for transmission of the video data to DCS node 26. Transmission of the data is delayed for a predetermined number of minutes in response to a first request for the video selection to allow for simultaneous transmission of the video data file to subsequent subscribers placing an order for the same title within the delay period. The subsequent request orders are also placed in the queue and the associated communications port ID is matched to the subscriber's network address.

After expiration of the predetermined delay, i.e., when current time as shown in the flowchart equals the designated start time, video data file is transmitted from VIP 140 or 160, as appropriate, through DCS nodes 24 and 26 to the designated ADSL interfaces 16 and 18 for transmission to subscriber premises 100 and 120. At the end of the program, a message is transmitted to Network Management System 28 to take the system down by terminating connectivity between DCS nodes 24 and 26.

In an enhanced version of the video-on-demand system, subscriber premises 120 (FIG. 2) is provided with a control unit 130 for receiving data commands from remote control 132. Remote control 132 can be a conventional infrared remote control for interacting with control unit 130. Data from control unit 130 is provided to subscriber ADSL interface 124 for transmission of command data to ISDN D-channel interface 38. The ISDN D-channel interface can provide subscriber order information directly to video gateway 30 in lieu of using voice response unit 34. Once video gateway 32 identifies a subscriber request to establish connectivity between a VIP 140 or 160, the address of control unit 130 is provided to the selected VIP. Upon receipt of the corresponding VIP network address by control unit 130, direct connectivity is established between control unit and VIP 140 or 160 over packet data network 40. This connectivity permits direct data transfer between the customer premises and the associated VIP to support interactive video control used in interactive educational programming and interactive video presentations such as video games.

Control unit 130 provides further functionality by providing for interactive control of the buffered video data. As shown in FIG. 2, temporary storage device 42 can be controlled over packet data network 40. Within the limits of data stored in the buffer, the subscriber can fast forward, rewind, forward, reverse search and pause the video/audio data provided via DCS 24 to the subscribers premises. If the requested function exceeds the capability of the temporary storage to buffer information provided by the VIP, the subscriber will have the option of cancelling the request or being rescheduled into a later transmission of the video programming. For example, if a pause request initiated via control 130 results in overflow of temporary storage 42, video transmission to the customer premises will either be continued with a message or, at customer direction, will be discontinued and the transmission rescheduled for later transmission.

VIPs 140 and 160 include respective control units 142 and 162 for accessing video storage units 144 and 164. As discussed above, the VIP stores the requested program material in coded or compressed digital format to minimize storage requirements and transmission bandwidth. Suitable video coding algorithms rely on Motion Compensated Prediction (MCP) and Motion-Compensated Interpolation (MCI). Motion Compensated Predictive/Interpolative Coding (MCPIC) is described in Wong et al. "MCPIC: A Video Coding Algorithm for Transmission and Storage Applications", November, 1990 IEEE Communications Magazine. MCPIC provides compression of video information for VCR quality playback using preprocessing and encoding of the video source information to obtain a coded bit stream. The bit stream represents a progressive format of 30 frames per second, each frame having 352×240 samples for luminance (Y) and 176×120 samples for each of two chrominance channels (U and V). The MCPIC algorithm supports video material ranging from slow to fast motion with a resolution equivalent to that of consumer-grade VCR's.

Another compression technique using Motion Estimation, Motion-Compensation Predictive Coding and Adaptive Discrete Cosine Transform (DCT) quantization is supported by the International Standards Organization (ISO) Moving Pictures Expert Group (MPEG). MPEG-1 specifies a video coding algorithm having a data rate of 1.2 MBPS. This digital-video and digital-audio compression standard can be accommodated by a T-1 line or a D-1 channel to provide full-motion video within the 1.544 MBPS data channel provided by an ADSL to the subscriber premises. MPEG programmable decoder/processors, capable of decompressing digital video in real time, have been produced by such companies as C-Cube Microsystems and LSI of San Jose, Calif. These or equivalent devices are incorporated into decoders 106 and 126 shown in FIG. 2 to generate standard NTSC analog video and analog audio signals.

In addition to the basic video-on-demand architecture shown in FIG. 2, other features can be incorporated into the PSTN under software control. For example, a subscriber can elect to implement call blocking through switch 12 to avoid interruptions from incoming calls during the duration of the video program. Incoming calls would instead be diverted to a subscriber's voice mail box. VRU 34 may additionally include voice recognition capability to support voice recognition security functions and voice selection of video programming.

Figure 8:
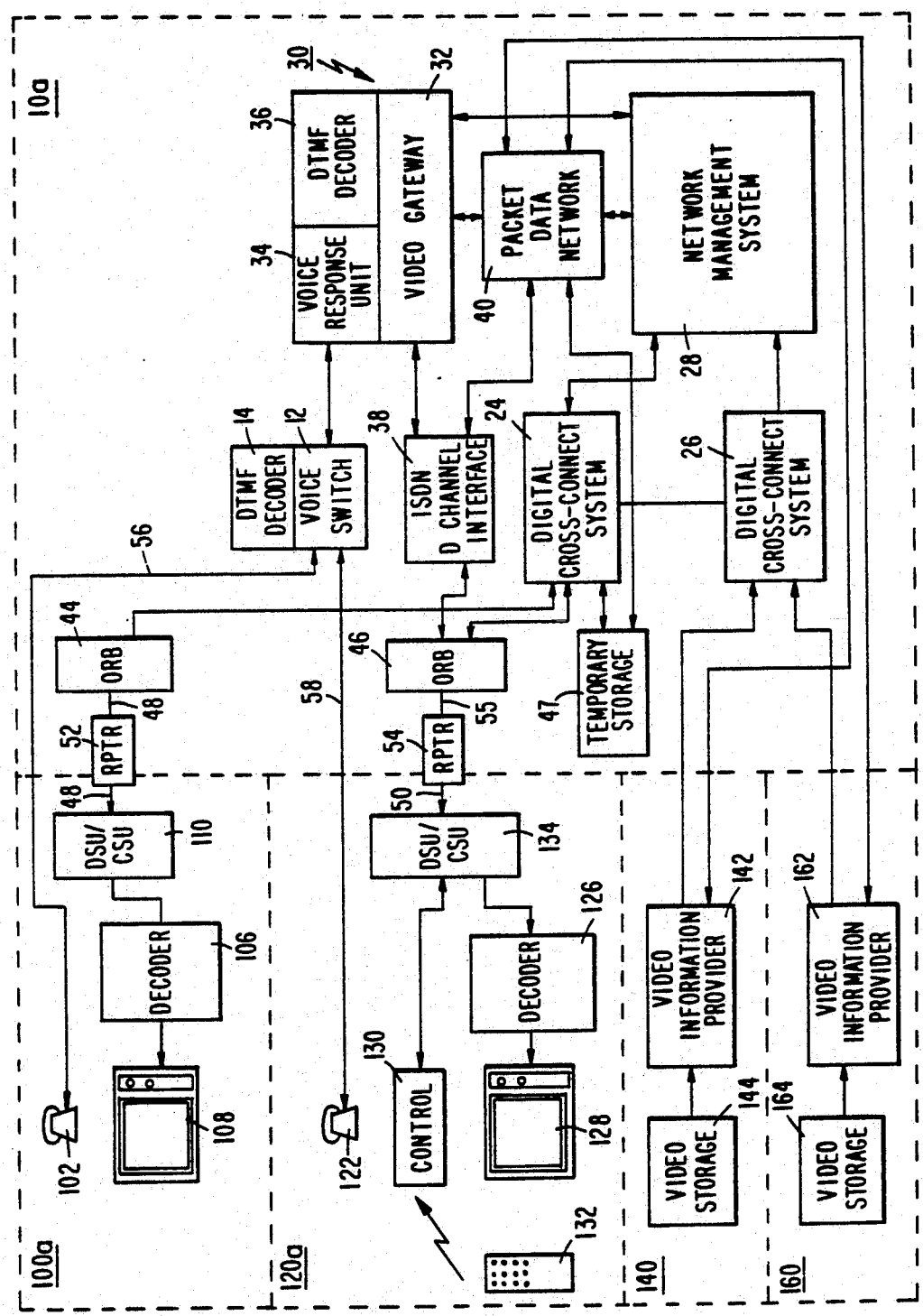
FIG. 8 is a block diagram of an alternate embodiment of a video-on-demand system using separate T1 and POTS loops.

An alternative embodiment of the invention is shown in FIG. 8 wherein connectivity between central office 10a and subscriber premises 100a and 120a is provided by respective High-bit-rate Digital Subscriber Lines (HDSL) and separate POTS lines. The HDSL uses bi-directional four wire T1 lines 48 and 50, including repeaters 52 and 54 to connect Office Repeater Bays (ORB) 44 and 46 to Customer Service Units (CSU) and Digital Service Units (DSU) 110 and 134 located in respective customer premises 100a and 120a. The HDSL requires two pairs and provides full duplex transport at a DS1 rate for loops limited to a CSA standard range. Because the HDSL does not provide a low bit-rate data channel, data from the subscriber premises to the CO is carried using full duplex bi-directional T1 service. Separate POTS service is provided on lines 56 and 58. The subscriber loop may also comprise a copper Digital Loop Carrier (DLC) wherein analog data is converted to a digital format and transported over a T1 copper loop circuit. The remaining structure and operation of the video-on-demand system shown in FIG. 8 is otherwise generally the same as discussed with respect to the embodiment shown in FIG. 2 of the drawings.

Although the present invention has been described and illustrated in detail, it is clearly understood that the same is by way of illustration an example and is not to be taken by way of limitation, the spirit and scope of the present invention being limited only by terms of the appended claims.

We claim:

1. A public switched telephone network for providing digital video signals from a video information provider to any one of a plurality of subscriber premises, comprising:

a telephone company central office receiving digital video signals from a video information provider and subscriber orders from a prescribed subscriber, said central office including a video gateway for providing video scheduling and routing data in response to subscriber orders and a switch for routing video signals from said video information provider to the prescribed subscriber in accordance with said scheduling and routing data;

a central office interface including, for each subscriber, a first frequency multiplexer/demultiplexer for transmitting or receiving audio telephone service signals, subscriber control signals and digital video signals on, respectively, first, second and third signal channels displaced from each other in frequency;

each said subscriber premises including a second frequency multiplexer/demultiplexer for transmitting or receiving audio telephone service signals, subscriber control signals and digital video signals on, respectively, the first, second and third signal channels; and a plurality of subscriber local loops interconnecting corresponding central office and subscriber interfaces.

2. The network of claim 1, wherein said first channel is a bidirectional channel carrying said audio telephone service signals between the subscriber and central office, said second channel is a unidirectional channel carrying subscriber control signals to said central office, and said third channel is a unidirectional channel carrying digital video signals from said central office to the subscriber.

3. The network of claim 2, wherein said first, second and third channels occupy progressively increasing frequency bands, with the first channel occupying the lowest.

4. The network of claim 3, wherein said first, second and third channels are non-overlapping.

5. The network of claim 1, wherein said subscriber interface includes a splitter for supplying telephone service and video signals incoming from the central office to telephone and television terminals.

6. The network of claim 1, wherein said local loops comprise wire pairs.

7. The network of claim 1, wherein said local loops comprise coaxial cable.

8. The network of claim 1, wherein said local loops comprise optical fibers.

9. The network of claim 1, wherein said subscriber interface includes a decoder for converting an incoming digital video signal to an analog video output signal.

10. The network of claim 9, wherein said decoder includes a decompressor for decompressing the incoming video signal and producing analog video and associated audio output signals.

11. The network of claim 1, wherein said central office further includes a packet data network responsive to said video gateway for supplying command signals to said video information provider.

12. The network of claim 1, including video storage means remote from the subscriber premises for buffering video data obtained from said switch and supplying buffered video data to a prescribed central office interface.

13. The network of claim 12, wherein said central office interface includes a control link output node for supplying said subscriber control signal to said video storage means.

14. The network of claim 1, wherein said video gateway comprises a memory storing subscriber access data, and further wherein said gateway is responsive to subscriber identification information and said stored access data to supply said video scheduling data to said video information provider.

15. The network of claim 1, including a voice switch responsive to telephone number data transmitted from said subscriber interface for establishing an audio connection from the local loop of a prescribed subscriber to the video gateway.

16. The network of claim 15, wherein said voice switch further supplies caller identification information to said video gateway that, in turn, supplies network address information to said switch for directing video data from the video information provider to a prescribed central office interface.

17. The network of claim 1, including voice response means for supplying to said switch a voice reply to order data received from a prescribed customer premises.

18. A public switched telephone network for providing digital video signals from a video information provider to any one of a plurality of subscriber premises, comprising:

a telephone company central office receiving digital video signals from a video information provider and subscriber orders from a prescribed subscribe, said central office including a video gateway for providing video scheduling and routing data in response to subscriber orders, a packet data network responsive to said video gateway from supplying command signals to said video information provider, a network management system and a digital cross-connect switch controlled by said network management system and said packet data network for routing video signals from said video information provider to the prescribed subscriber in accordance with said scheduling and routing data;

a central office interface including, for each subscriber, a first frequency multiplexer/demultiplexer for transmitting or receiving audio telephone service signals, subscriber control signals and digital video signals on, respectively, a first bidirectional signal channel and second and third unidirectional signal channels all displaced from each other in frequency;

each said subscriber premises including a second frequency multiplexer/demultiplexer for transmitting or receiving audio telephone service signals, subscriber control signals and digital video signals on, respectively, the first, second and third signal channels; and a plurality of subscriber local loops interconnecting corresponding central office and subscriber interfaces;

said central office further including a voice switch responsive to telephone number data transmitted from said subscriber interface for establishing an audio connection from the local loop of a prescribed subscriber to the video gateway and further supplying caller identification information to said video gateway that, in turn, supplies network address information to said cross-connect switch for directing video data from the video information provider to a prescribed central office interface.

19. A public switched telephone network for providing digital video signals from a video information provider to any one of a plurality of subscriber premises, comprising:

a telephone company central office receiving digital video signals from a video information provider and subscriber orders from a prescribed subscriber, said central office including a video gateway for providing video scheduling and routing data in response to subscriber orders, a packet data network responsive to said video gateway for supplying command signals to said video information provider, a network management system and a digital cross-connect switch controlled by said network management system and said packet data network for routing video signals from said video information provider to the prescribed subscriber in accordance with said scheduling and routing data;

a central office interface including, for each subscriber, a first frequency multiplexer/demultiplexer for transmitting or receiving subscriber control signals and digital video signals on first and second unidirectional signal channels;

each said subscriber premises including a telephone set and a second frequency multiplexer/demultiplexer for transmitting or receiving audio subscriber control signals and digital video signals on, respectively, the first and second signal channels; and a plurality of subscriber local loops interconnecting corresponding central office and subscriber interfaces;

said central office further including a voice switch responsive to telephone number data transmitted from said subscriber telephone set for establishing an audio connection from the prescribed subscriber to the video gateway and further supplying caller identification information to said video gateway that, in turn, supplies network address information to said cross-connect switch for directing video data from the video information provider to a prescribed central office interface.

* * * * *